(No Model.) 3 Sheets—Sheet 1.

L. S. CHICHESTER.
WATER RENOVATING AND PURIFYING DEVICE.

No. 400,301. Patented Mar. 26, 1889.

WITNESSES: INVENTOR

L. S. Chichester,
BY Drake ATT'YS.

(No Model.) 3 Sheets—Sheet 2.

L. S. CHICHESTER.
WATER RENOVATING AND PURIFYING DEVICE.

No. 400,301. Patented Mar. 26, 1889.

WITNESSES: INVENTOR

E. L. Sherman
Philip G. Coughlin

L. S. Chichester,
BY Drake & Co. ATT'YS (No Model.) 3 Sheets—Sheet 3.
L. S. CHICHESTER.
WATER RENOVATING AND PURIFYING DEVICE.
No. 400,301. Patented Mar. 26, 1889.
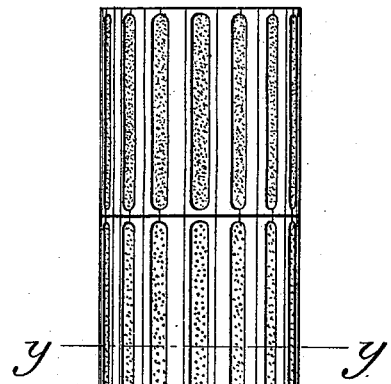
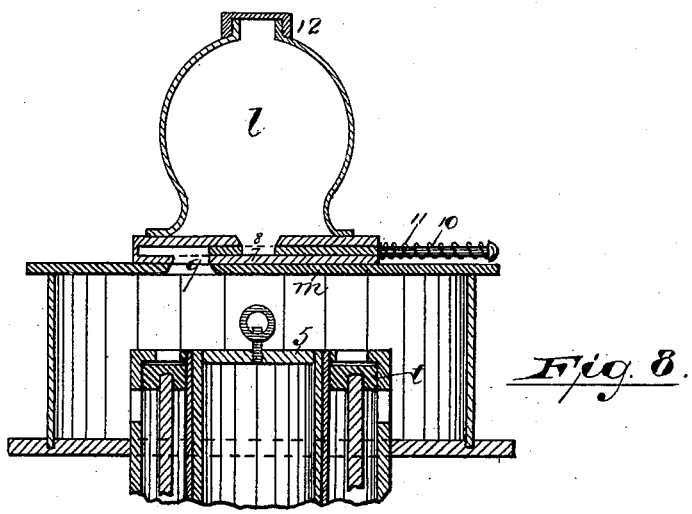
WITNESSES: INVENTOR
E. L. Sherman
Philip G. Voigtlen
L. S. Chichester
BY Drake & Co, ATT'YS.

UNITED STATES PATENT OFFICE.

LEWIS S. CHICHESTER, OF NEWARK, NEW JERSEY, ASSIGNOR TO CARROL PHILLIPS BASSETT, OF SAME PLACE.

WATER RENOVATING AND PURIFYING DEVICE.

SPECIFICATION forming part of Letters Patent No. 400,301, dated March 26, 1889.

Application filed March 23, 1888. Serial No. 268,259. (No model.)

*To all whom it may concern:*

Be it known that I, LEWIS S. CHICHESTER, a citizen of the United States, residing at Newark, in the county of Essex and State of New Jersey, have invented certain new and useful Improvements in Water Renovating and Purifying Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide more efficient means for purifying and renovating water and rendering it more fit for drinking and other purposes; and it consists in the arrangement and combination of parts, substantially as will be hereinafter set forth, and finally embodied in the clauses of the claims.

Figure 1:
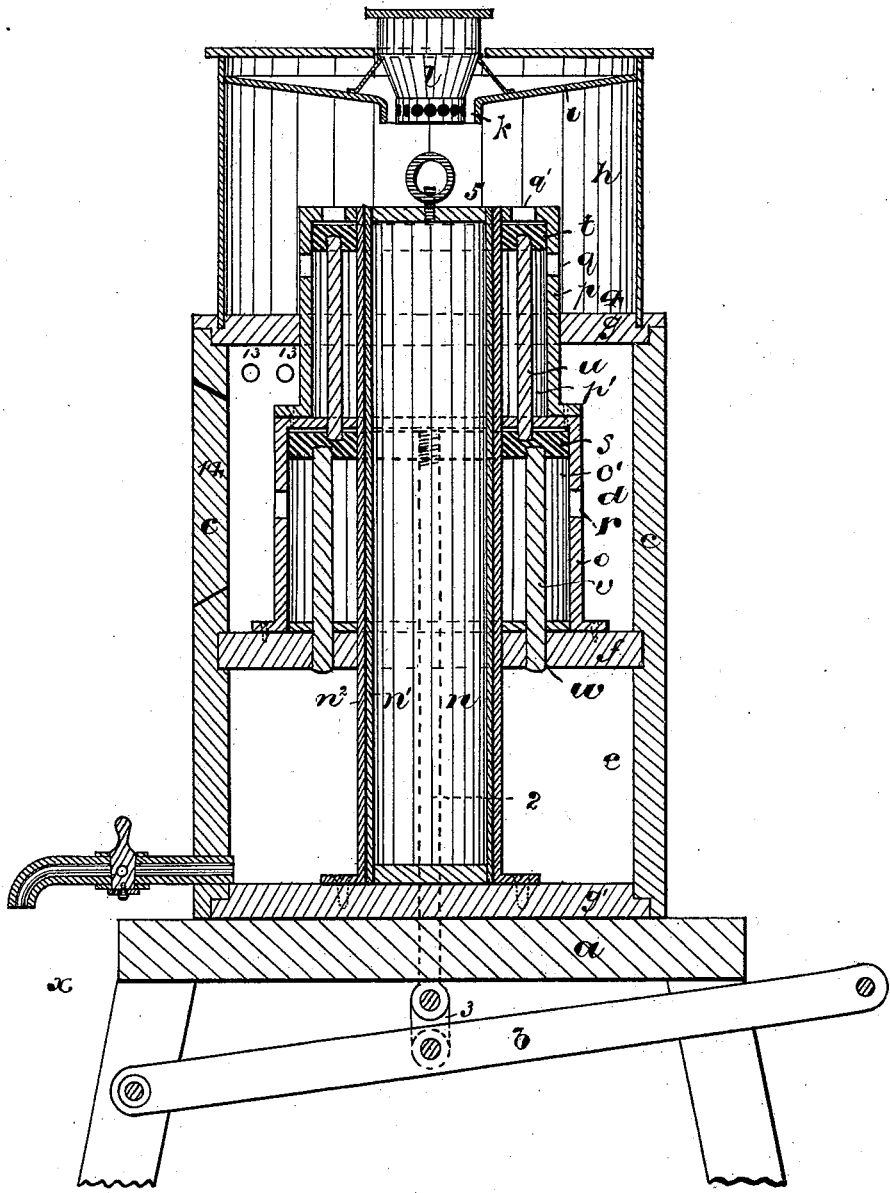
Figure 2:
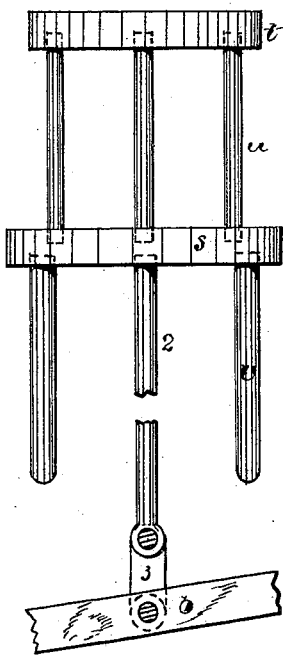
Figure 3:
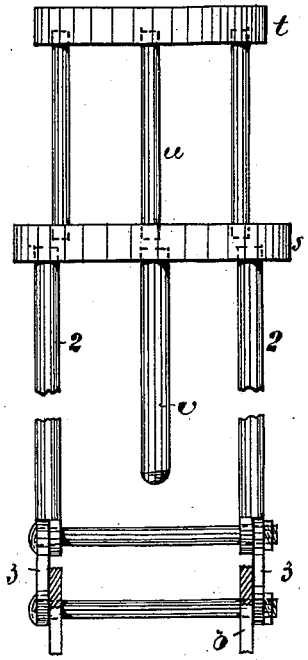
Figure 4:
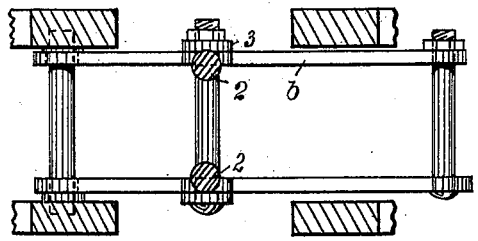
Figure 5:
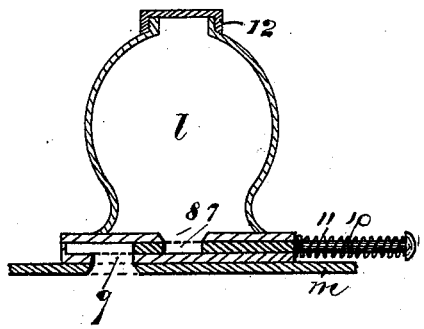
Figure 6:
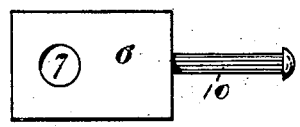

Referring to the accompanying drawings, embraced in three sheets, in which like letters of reference indicate corresponding parts in each of the several figures, Figure 1, Sheet 1, is a central vertical section of the improved renovator, showing the relation of the several parts thereof. Figs. 2 and 3, Sheet 2, are detail views of a certain piston, or piston and co-operating parts, employed in forcing the water through the filtering medium and in aerating the said water. Fig. 4 is a section taken on line $x$, showing a certain lever for operating the said piston. Fig. 5 is a vertical sectional view showing the coagulant-chamber, or means for supplying the coagulant to the water in limited quantities. Fig. 6 is a plan of a valve which may be employed in dealing out the said coagulant to the water. Fig. 7 is a detail elevation of a filtering medium. Fig. 7ª is a sectional view of the same on line $y$; and Fig. 8 shows the upper portion of a renovating device, showing a preferred construction.

In said drawings, $a$ indicates a suitable bed-plate or table which provides a support for filtering, aerating, and coagulating mechanisms, and provides bearings for the lever $b$, which is employed or may be employed in operating the movable parts of the said mechanisms. Upon the said bed-plate or table $a$ is formed or arranged a case, $c$, which may be, and preferably is, of wood. This may be divided into chambers $d$ and $e$ by a partition, $f$, the said case being provided at the top with an upper plate, $g$. Above the said plate $g$ is suitably formed an unfiltered-water chamber, $h$. At the top of said unfiltered-water chamber $h$ is formed, or may be formed, a funnel, $i$, having a passage, $k$, leading into said chamber. The funnel may be dispensed with, as indicated in Fig. 8.

At the passage or spout $k$ may be formed or arranged a coagulant-chamber, $l$, although the said chamber may be, and preferably is, as shown in Figs. 5 and 8, where the said chamber is arranged upon a cover, $m$, of the said unfiltered-water chamber, and provided with means, hereinafter more particularly described, for dealing out the dry coagulant into the unfiltered water in limited quantities. At the center of the said series of chambers $e$, $d$, and $h$ is arranged a cylindrical chamber, $n$, which is formed of or provided with suitable filtering materials. The filtering portion of said cylinder may be, and preferably is, constructed of compressed carbon, although it may be of fiber, porous pottery, or stone, burned clay, or any other suitable filtering material. When the said filtering cylinder is of compressed carbon or other material capable of sustaining itself against pressure, I prefer to make it the inner wall, $n'$, of the cylinder $n$. Outside or around it is a facing of metal, $n^2$, which is perforated, as indicated at $n^3$ in Fig. 7, Sheet 3, to allow access of the unfiltered water to said filtering material. The said facing or perforated covering, when used, is made of very thin metal, and the perforations may be filled flush with the outer surface of the facing, so that there will be a proper engagement with the piston and no loss of suction. The outer facing, $n^2$, provides a suitable bearing for the piston to work upon; or the said bearing may be secured in any other suitable manner. On the outside and around the said filtering-cylinder are formed a series of cylinders, $o$ $p$, which open, respectively, into an ice-chamber, d, and into an unfiltered-water chamber, h, being provided with passages or openings q and r for that purpose. Within said cylinders o and p are arranged annular piston-heads s and t, which are connected with one another, so as to move simultaneously, by rods u. The lower of the said piston-heads may be provided with guiding-rods v, which extend down to and through a partition, f, and work in perforations w. The said guiding-rods v may be dispensed with and the connecting-rods 2 be depended upon alone for guiding purposes. The said connecting-rods 2 are secured at their upper extremities to the lower of the piston-heads and at their lower extremities to the lever b, the said connecting-rods passing through suitable perforations in the partition f in the bottom plate, g', and table a. The said connecting-rods at their lower extremities are provided, preferably, with links 3, whereby the said connecting-rods are allowed a straight vertical movement through the said perforations, so that the joints therearound may be made impervious to water. By means of the lever b the connecting-rods and pistons connected thereto may be given a reciprocating movement by the hand. The piston-heads s and t are annularly formed and extend around the cylindrical filtering medium and across the chambers o' and p' within the cylinders o and p, the said piston-heads forming, with the outer wall of the filtering mediums and the inner wall of the cylinders, practically impervious joints. To secure such impervious joints, the said piston-heads may be packed in any suitable manner. The piston-heads being at the upper limit of their stroke, as shown in Fig. 1, the water from the unfiltered-water chamber h is allowed to pass through the openings q q' into the upper cylinder-chamber, p'. The downward movement of the lever v causes the piston-head t to descend. The inflow of water to the said chamber p' is immediately cut off by the said piston-head t, so that the unfiltered water in the chamber p, below said piston-head t, is immediately brought under pressure. The descent of the piston-head being continued, the water is forced through the filtering medium n' into the chamber n, the water running down the side walls of the said chamber n. The lower piston, s, working in the cylinder o, after passing over the air-inlet r, cuts off the exit of air from the said cylinder, excepting through the porous filtering medium. Continued downward movement then forces the air through the said medium into contact with the water flowing over the interior surfaces of the cylinder, thus tending to break up the water into a spray or otherwise bringing the air into very intimate contact with the water, and at the same time creating considerable air-pressure within the chamber n. The water when it arrives at the bottom of the cylinder, and under the influence of the air thus compressed in the chamber n, is forced outwardly through the filtering medium into the filtered-water chamber e, surrounding the lower end of the filtering medium. In the return or upward stroke of the piston-head the water that has followed the upper piston-head, t, down is forced back through the openings q and q' into the unfiltered-water chamber, together with any air which may have escaped through the upper portion of the filtering medium, and thus a circulation or thorough mixing of the water in the unfiltered-water chamber is produced, which tends to bring the coagulant into effective contact with all parts of the unfiltered water, so that all impurities are curdled or coagulated before they are brought into contact with the filtering medium. In the upward stroke of the piston-head t the movement of the water produced by said upward stroke tends to remove the deposit or sediment on the outside of the filtering material, forcing the said sediment back into the chamber h, where it may be deposited in the pocket 4, formed at the bottom of the chamber h, where the water remains more quiet. It will be noticed that the air-inlets r are lower in their relation to the top of the cylinder o than the openings q are in their relation to the top of the cylinder p. By this construction, when I desire to pump air into the chamber n, without forcing the water therein to any great degree, I may do so by short strokes of the lever and piston-heads connected therewith at the lower part of their range of movement—that is to say, by bringing the piston-head s below the opening r and continuing the movement downward the air in the lower part of the cylinder-chamber is forced into the chamber n. On a return movement the lever b and piston-head s are raised until the latter is above the opening r, to allow the entrance of a fresh supply of air; but the lever is not raised so high as to bring the piston-head t above the opening q. As a result, very little, if any, water is allowed to enter into the cylinder p, and thus by a continuous reciprocating movement air alone is pumped into the said chamber n. In the upper part of the cylinder p the movement of the water following the piston-head t—that is to say, on the upward stroke of the pistons—the air confined above the opening r is forced into the chamber n, while the water above the piston-head t is forced back into the chamber h, while in the upper cylinder such a stroke simply tends to mix the water in the unfiltered-water chamber and wash off the upper part of the cylinder, there being but little pressure brought upon the water in the lower part of the chamber p'. Thus any water that is filtered by gravity alone in the chamber n while the filter has been standing for any considerable length of time may be aerated.

The filtering medium n' may be of one integral piece of material, of uniform density, or the density of said integral piece may be varied; or the said medium may be made in sections, as in Fig. 7, and this last construction is preferred. In this case the upper section, where it is intended to first filter the water, may be of a medium density. Below this, where it is to allow the air to pass through to the filtered water, the said material may be more porous or of a coarser nature, while at the lower extremity, where the water is filtered for the second time, the said medium may be more dense; or instead of density the thickness of the cylinder may be varied, the density being uniform throughout, while the thickness of the medium is varied.

The ice-chamber $d$ is provided with suitable air-inlets, 13, to allow access of the outer atmosphere to said chamber, and with a door, 14, to allow the ice to be introduced to the chamber $d$. The said air-openings are so disposed that the air will be brought into intimate contact with the ice before passing into the cylinder.

The pure-water chamber $e$ is provided with a cock or faucet, whereby the pure water may be drawn off for use.

The parts are so arranged in their relation to one another that the same may be removed from each other, access thereby being readily gained to the several chambers, and the filtering medium may be drawn from its seat within the cylinder quickly and easily and be brought into contact with boiling water in any way, and thus impurities in the water or disease-germs may be killed or destroyed. A cover, 5, Fig. 1, by means of which access may be gained to the chamber $n$, is suitably held in place in or on the cylinder, so that it cannot be disconnected under the pressure of the air.

In providing means for supplying the requisite amount of alum or other coagulant in a dry state to the water I provide at the bottom of the coagulant-chamber $l$, which is separated from the unfiltered-water chamber by a closed partition adapted to prevent the unfiltered water from wetting the body of coagulant, a slide or valve, 6, Figs. 6 and 8, having a receptacle, 7, therein adapted to receive the coagulant through the opening 8, Fig. 5. The said slide 6 carries the coagulant to the opening 9, from whence the said coagulant drops into the unfiltered water, and is mixed therein by means hereinbefore referred to. The said valve or slide may be operated by a rod, 10, Fig. 6, and held in its closed position by means of a spring, 11. The said coagulant-receptacle may be provided with a cap or cover, 12.

I do not wish to be understood as limiting myself to the exact arrangement and construction of parts shown, as various changes may be made other than have been herein positively provided without departing from the spirit or scope of the invention—as, for example, the cylindrical filtering medium may be of any other shape than that of a cylinder.

It will be observed that in this device the pressure by which the air is brought into intimate contact with the water and the air is forced through the filtering medium, and thus freed of mechanical impurities, is secured from mechanism within the device as distinguished from pressure obtained through a pipe—such as a water-pipe from other sources. Thus the invention can be readily used in steamers and places distant from such source of power.

Having thus described the invention, what I claim as new is—

1. The combination, with a filtering-cylinder, of a case or structure having an unfiltered-water chamber, an air-chamber, and a filtered-water-chamber formed therearound in a series, substantially as and for the purposes set forth.

2. In a filter, in combination, a cylindrical filter forming the vertical chamber $n$, around which is formed an outer chamber, $p$, and a piston-head adapted to force the water through the said cylinder into the said chamber $n$, and means for operating said piston-head, substantially as and for the purposes set forth.

3. In combination, in a case, $c$, having partitions $f$ and $g$, forming chambers $h$, $d$, and $e$, a porous pipe or cylinder extending through said partition into said chambers, cylinders $o\ p$, piston-heads $s\ t$, and means, as described, for operating said piston-heads, whereby water and air are forced through said porous pipe, substantially as and for the purposes set forth.

4. In combination with a partitioned case having a series of chambers therein and a porous cylinder or pipe extending into or through said chambers, suitable cylinders, $o\ p$, and piston-heads for forcing air and water through said porous pipe, substantially as and for the purposes set forth.

5. In a filter, the combination, with a porous pipe or cylinder and a piston-head working thereon, and a suitable co-operating cylinder, of a perforated facing providing a bearing or wearing surface for said piston and adapted to allow the passage of water to said porous pipe or cylinder, substantially as set forth.

6. In combination with a case having unfiltered and filtered water chambers and an air-chamber, a porous pipe or cylinder extending through or into said chambers, suitable cylinders, piston-heads, and a rod or rods for operating said heads, and a hand-lever, all said parts being arranged and adapted to operate substantially as and for the purposes set forth.

7. In combination, a suitable case partitioned off to provide a filtered-water chamber at the bottom, an unfiltered-water chamber above, and an intermediate air-chamber, porous media forming walls for said chambers, and means for forcing air through said filtering media into contact with water filtered from the upper chamber, substantially as set forth.

8. In combination, a suitable casing having a filtered-water chamber, an air-chamber, and an unfiltered-water chamber, and a chamber formed by porous walls extending vertically through or into said chambers, and a coagulant-chamber adapted to supply coagulating material to the unfiltered water, and piston-heads and suitable cylinders therefor for forcing the unfiltered water supplied with coagulant through said porous walls and into said filtered-water chamber, a lever, and means for connecting said piston-head with said lever, substantially as set forth.

9. The improved water-renovator, combining therein a case partitioned off into a filtered-water chamber, and air-chamber, an unfiltered-water chamber, and a coagulant-chamber, a porous pipe or cylinder, cylinders $o\ p$, having openings $r$ and $q\ q'$, piston-heads $s$ and $t$, connecting-rods, a lever, links connecting said connecting-rods with said lever, suitable openings in said case to allow the introduction of air and ice into said air-chamber, and a faucet for drawing off the pure water, as and for the purposes set forth.

In testimony that I claim the foregoing I have hereunto set my hand this 16th day of March, 1888.

LEWIS S. CHICHESTER.

Witnesses:
CHARLES H. PELL,
E. L. SHERMAN.